United States Patent [19]
Jorgensen

[11] B  3,981,607
[45] Sept. 21, 1976

[54] BORING BAR WITH REMOVABLE AND INDEXABLE CUTTING INSERT

[75] Inventor: Arne R. Jorgensen, Lombard, Ill.

[73] Assignee: Illinois Tool Works Inc., Chicago, Ill.

[22] Filed: Nov. 7, 1974

[21] Appl. No.: 521,986

[44] Published under the second Trial Voluntary Protest Program on February 3, 1976 as document No. B 521,986.

[52] U.S. Cl. ................................ 408/146; 29/98; 408/188; 408/713
[51] Int. Cl.² ........................................ B23B 29/04
[58] Field of Search .......... 408/188, 180, 146, 713; 29/98, 568

[56] References Cited
UNITED STATES PATENTS

| | | |
|---|---|---|
| 1,673,039 | 6/1928 | Brown .................................... 29/98 |
| 2,630,732 | 3/1953 | Piazze .................................. 29/98 X |
| 3,793,708 | 2/1974 | Watanabe et al. .................... 29/568 |
| 3,838,500 | 10/1974 | Wirfelt ................................. 29/568 |

Primary Examiner—Travis S. McGehee
Assistant Examiner—Z. R. Bilinsky
Attorney, Agent, or Firm—G. W. Bowen; R. W. Beart

[57] ABSTRACT

A boring bar having a removable indexable cutting insert with a plurality of cutting edges is disclosed. The cutting insert is held in place in the bar by a locking finger on an insert clamp which is locked into place by a ball which is wedged against a release pin that engages the clamp. The ball may be moved so as to allow the pin to move, thereby releasing the force applied by the clamp whenever the insert is to be indexed or whenever a replacement of the insert is required. This is achieved by either manual or hydraulic control of a wedge shaft that engages the ball.

4 Claims, 4 Drawing Figures

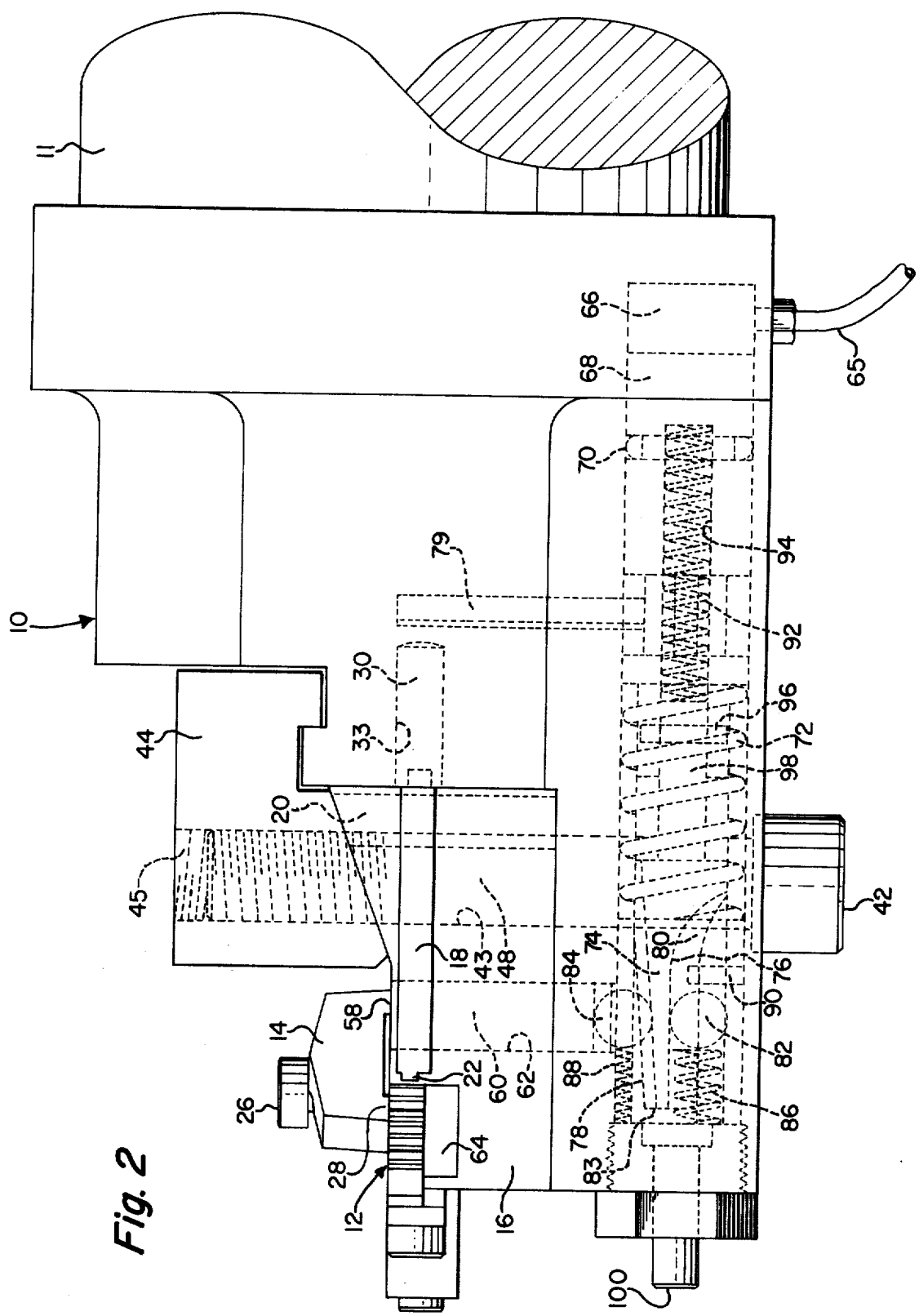

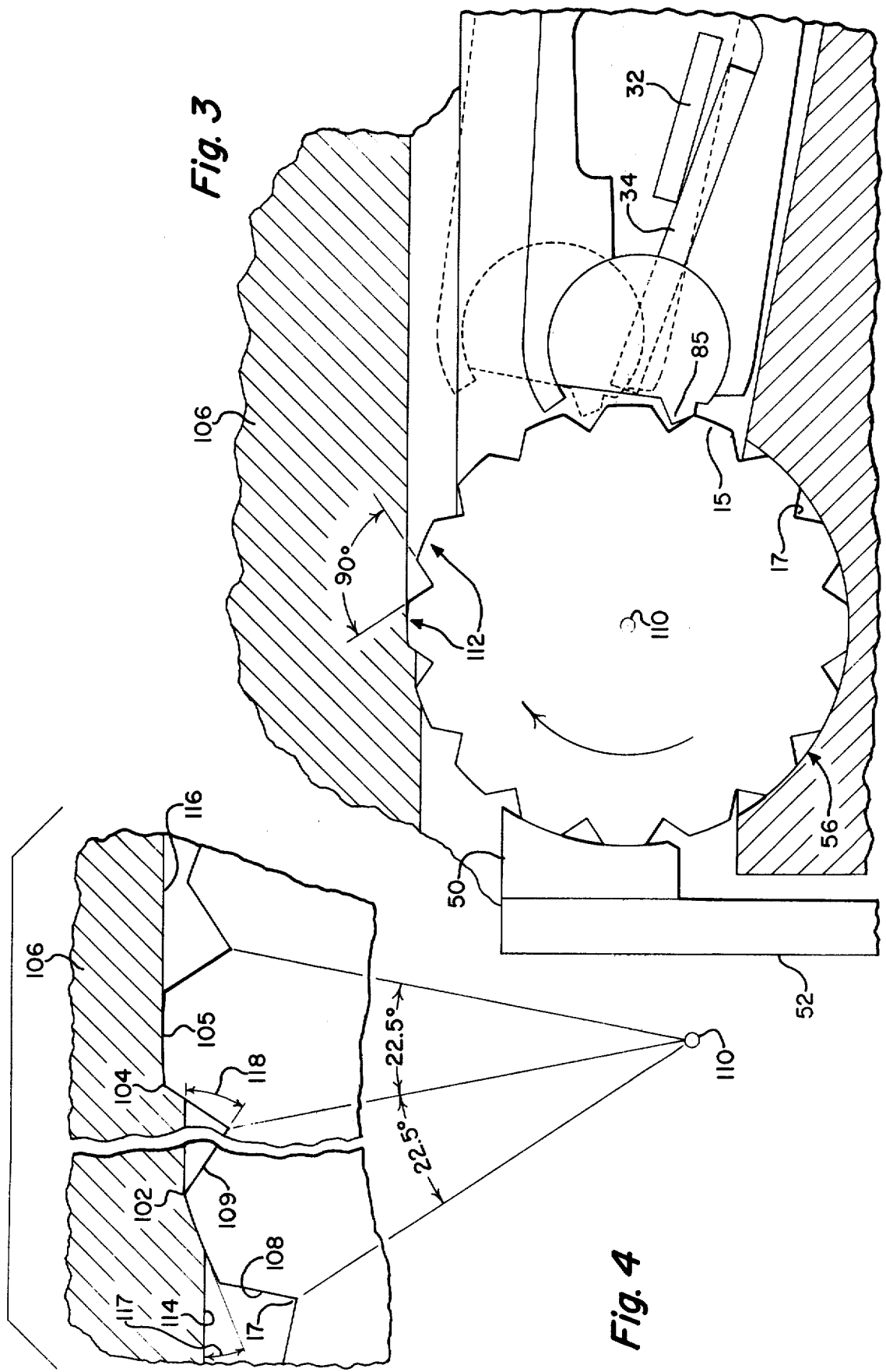

BORING BAR WITH REMOVABLE AND INDEXABLE CUTTING INSERT

BACKGROUND OF THE INVENTION

The present invention relates to a boring bar and a removable cutting insert having a plurality of edges which are indexed sequentially so that a new edge is available for cutting as an old edge becomes worn. The boring bar is particularly useful for machining rotary-type, internal combustion engines which have a metal alloy layer on the inner surface wall of the cylinder. The material is generally of a type which is called "transplant" material. Transplant material is very difficult to machine; and, moreover, the aluminum wall and ribs that lie between the transplant material vary in stiffness around the epitrochoidal surface of the cylinder block. Thus, a substantial increase in the normal cutting force of the machining tool for the transplant material can deform the housing unevenly resulting in form error.

The transplant material on the cylinder walls of a rotary engine block might be ground or milled. However, these machine processes have decided disadvantages which make them unattrative. Grinding is very time consuming because of the amount of transplant material that must normally be removed. In addition, in grinding, special precautions must be taken to compensate for the deflection of the housing at various sections during the grinding operation. Milling also takes too long of a time to be efficient; and, in addition, milling will generally not be as accurate as boring due to cutter deflection and tool wear. Milling cutters also will not normally stand up long enought to give a satisfactory finish and size at an economical rate. In addition, milling machines generally will be more complicated and expensive than a boring machine which utilizes the boring tool and insert of the present invention.

It is emphasized that the boring tool and insert of the present invention are useful for general purpose boring applications. However, the tool is especially useful in forming an epitrochoidal surface, as previously mentioned. In particular, it may be employed in the boring machine disclosed in U.S. Pat. No. 3,812,746 issued May 28, 1974, in the name of Oliver Edward Saari, and assigned to Illinois Tool Works Inc. The machne of the Saari patent was designed to rapidly form an epitrochoidal surface within a recessed cylinder bar with a high degree of accuracy but without vibrations which might otherwise result in unbalanced machine operation. This machine was designed so as to maintain the rapidly moving parts of the machine and the relatively heavy cylinder bar in kinetic balance. A single tool element or cutter, such as a conventional boring bar, was disclosed in the prior Saari patent.

In the machine of the Saari patent, a unique mechanism was provided for coupling the rotary tool actuating device or spindle and the boring bar, which was slightly offset from the spindle axis. This mechanism was operable so as to precisely locate the cutting extremity of the supported tool in contact with the surface that defines the cavity being machined.in the work piece so that as the work piece rotated at a relatively high speed about a fixed axis, coincident with the center of the cavity, an accurate epitrochoidal surface was formed. The coupling means between the tool actuating means and the tool supporting means was oscillated within predetermined limits about the fixed axis, thereby maintaining the fixed axis and the point of engagement of the tool with the surface defining the cavity in a common plane extending normal to a line tangent to the epitrochoidal surface at the point of contact between the tool and the work piece.

Cutting tools, such as those found in conventional boring bars, are expected to last for the machining of many parts before the tool has to be adjusted to hold the part size, or before the insert is indexed to a new cutting edge. The mechanism of the present invention, on the other hand, utilizes a relatively inexpensive removal cutting insert, which is indexed to a new point after every cycle of operation during the time period, while a finished housing is being unloaded and a new housing is being loaded on the boring machine. Each insert is manufactured accurately so that once the tool is positioned and established, the tool is not repositioned when the insert is indexed or when it is replaced.

Only one or two work pieces, such as rotary cylinder blocks, will be bored by each cutting edge, but there are a large number of cutting edges per insert on the tool; and a relatively large number of cylinder blocks may be machined without replacing the insert. The insert cutting edges are designed to optimize the surface finish with rapid-feed, minimal normal cutting force and minimal dulling of the cutting edge during the boring operation. The cutting tool is indexed automatically in the boring bar during each cycle of operation, and it is removable from the boring bar; and a new insert is insertable in a particularly simple and fast manner.

It is an object of the present invention to provide an improved boring bar and removable and indexable cutting insert which may be employed in the machine of the Saari patent and in other boring machines.

DESCRIPTION OF THE DRAWINGS

The present invention is illustrated in the following drawings in which:

FIG. 2 is a top view of the boring bar and removable cutting tool insert with internal parts shown in phantom view;

FIG. 3 is an enlarged view of the cutting tool insert and indexing mechanism of FIG. 1; and FIG. 4 is an enlarged view of FIG. 3 showing several cutting edges of the cutting insert as they machine the surface of a work piece.

TECHNICAL DESCRIPTION OF THE INVENTION

Figure 1:
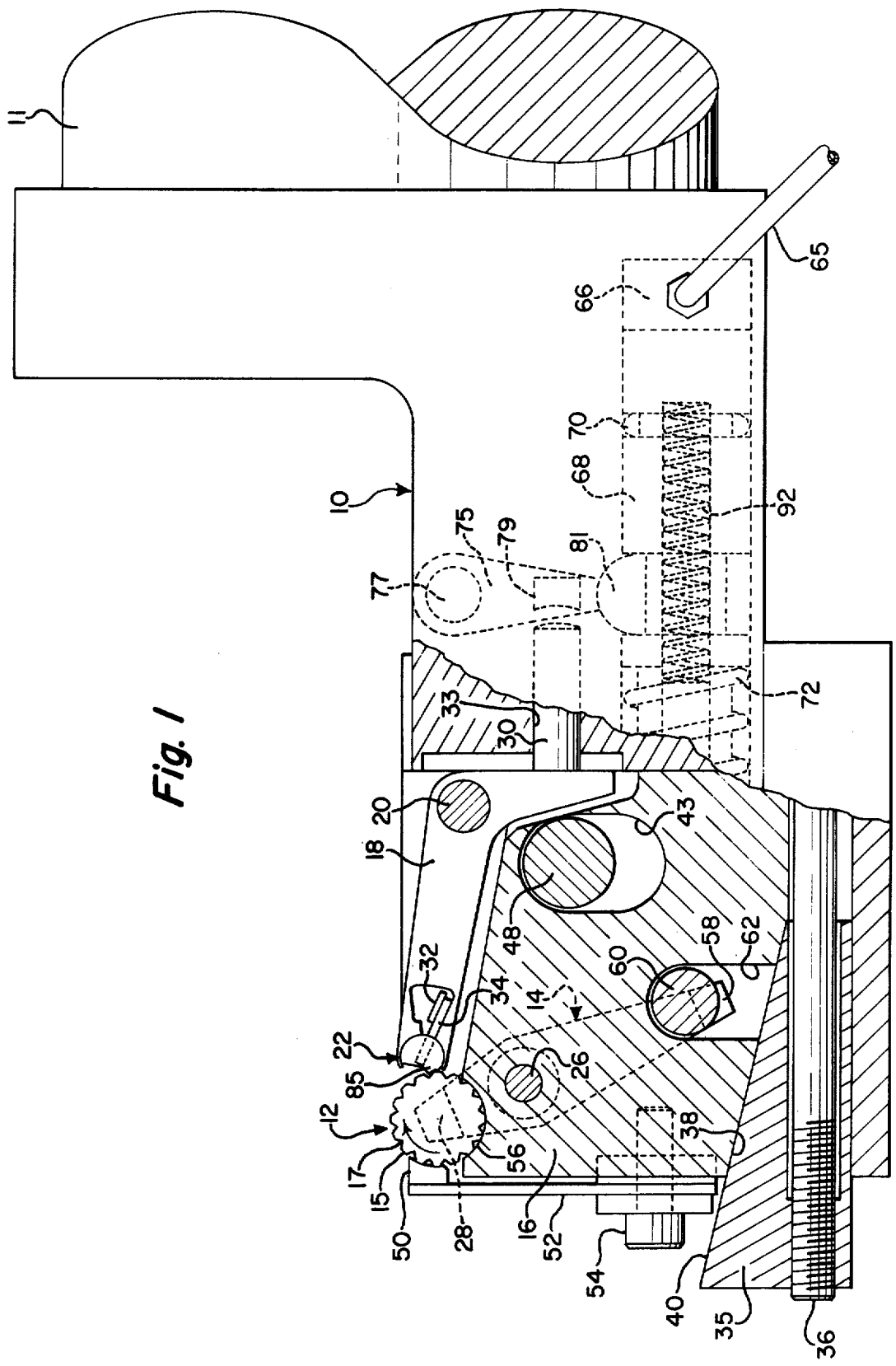
FIG. 1 is a partial cross-sectional side view of the boring bar and cutting tool insert of the present invention.

Referring to FIG. 1 of the drawings, a head 10 is secured on or is a part of a boring bar 11 which carries a removable cutting insert 12. The removable cutting insert 12 has a number of cutting teeth which are successively indexed in order for boring of the surface of a work piece, such as the cylinder cavity of a rotary engine for example. The cutting insert 12 is held in the tool block 16 of the head 10 by means of a rocking insert clamp 14, which is shown in phantom view in FIG. 1, because it is on the surface of the heat away from the front surface. The insert 12 is held in an insert tool block 16 by a clamp 14 during the boring operation. Following the completion of the boring operation and during the time that one work piece is being exchanged for a second work piece, the cutting insert 12 will be indexed so that a new tooth 15 is available for machining.

Indexing is achieved by the motion of a toggle bell crank 18 which is pivoted about a pivot shaft 20. The bell crank 18 has a toggle pin 22 on its forward end which interacts with the notches 17 between the teeth 15 to achieve indexing. During the time that indexing is being accomplished, the rocking insert clamp 14 rocks about a clamp holding screw 26 so that the locking finger 28 of the clamp 14 is swung away from the cutting insert 12, thereby allowing the toggle pin 22 to revolve the insert 12 by a controlled amount. The manner in which this is achieved is described in more detail subsequently.

The lower end of the bell brank 18 has a crank return pin 30 that projects from it which fits into a corresponding bore 33 in the tool holder 10. A leaf index spring 32 has one end hooked to the tool block 16, and the other end supplies a bias to an arm 34 of the bell crank 18 in order to return the bell crank 18 to its initial position after indexing has been accomplished by motion of the bell crank 18 within the limits determined by the return pin 30. The pin 30 is somewhat larger than the groove in the tool block 16 for the bell crank 18.

The position of the tool insert block 16 is adjustable in the tool head 10 by controlling the position of a vernier adjustment block 35 through adjustment of an adjusting screw 36. A lower surface 38 of the tool insert block 16 mates with an inclined upper surface 40 of the adjustment block 35 so as to locate the tool insert block 16 at the desired location. The tool insert block 16 is secured to the tool head 10 by means of a locking screw 42 which has a shaft 48 which passes through a slot 43 of the insert tool block 16 into a threaded hole 45 of a tool clamping block 44. The shape of theslot 43 through the insert tool block 16 is oval and is slightly larger than the shaft 48 to allow for additional adjustment of the insert tool block 16 with respepct to the tool head 10.

A brake 50 constructed of a resilient material, such as rubber, is connected to an elongated arm 52 which is secured to the tool insert block 16 by means of a lock screw 54. The purpose of the brake 50 is to apply a force radially inwardly on the cutting tool insert 12 when the cutting insert 12 is rotating in the direction indicated by the arrow in FIGS. 1 and 3. This biases the cutting insert 12 towards its retaining recess 56 in the tool insert block 16.

Replacement of cutting inserts is achieved in a quick and simple manner in the boring bar of the present invention. The finger 58 of the blocking insert clamp 14 engages a pin 60 which is disposed in a bore 62, as best shown in FIGS. 1 and 2. When the cutting tool insert 12 is clamped firmly into place, the finger 28 of the rocking insert clamp 14 is pushed upwardly by the clamp release pin 60 in order to drive the finger 28 into engagement with the cutting tool insert 12. A ceramic shim 64 is placed behind the cutting tool insert 12 in order to relieve the force on the insert during a cutting operation. When the cutting tool insert 12 is to be removed, the pin 60 will be released downwardly in a manner which is subsequently described in greater detail, thereby relieving the force on the finger 28 so that the insert clamp 14 may be rocked in order to force the finger 28 away from the insert thereby allowing it to be removed from the tool insert block 16.

Control for upward and downward movements of the clamp release pin 60 and of the action of the toggle bell crank 18 is achieved by means of a hydraulic control system which is best shown in FIG. 2. Hydraulic fluid is brought in through a tube 65 to the chamber 66 which has a piston in it. An O-ring 70, or other sealing member, is provided around the piston 68 to seal against the leakage of fluid. The hydraulic fluid in the cylinder 66 is pumped by a pump (not shown) which either acts to force the piston 68 to the left or allow it to be returned to the right, as viewed in FIG. 2, due to the action of the piston return spring 72.

The forward end of the piston 68 carries a ballwedge shaft 74 which has a curved lower surface 76 and a ramp of a low inclined angle which forms its upper surface 78. The wedge shaft 74 projects into a bore 80 which contains a lower ball 82 positioned below the surface 76 and an upper ball 84 positioned above the surface 78. A bias spring 86 is used to bias the ball 82 towards the right; and a smaller bias spring 88 is used to bias the ball 84 towards the right, as viewed in FIG. 2. When hydraulic pressure is applied to the piston 68, it is forced to the left; and the wedge shaft 74 is, therefore, also forced to the left causing the ball 82,84 to rotate as the wedge shaft 74 moves. As the balls 82,84 rotate, they are disposed, as shown in FIG. 2, where it is seen that the ball 84 is positioned to force the clamp release pin 60 upwardly against the finger 28 of the rocking insert clamp 14, thereby locking the cutting tool insert 12 in the insert tool block 16. A ball stop 90 locates the ball 82 when hydraulic pressure is released on the piston 68, and the wedge shaft 74 will then move to the right. This allows the clamp release pin 60 to drop down as the ball 84 drops down, thus, relieving the force on the cutting insert tool 12 that had been applied by the finger 28 of the rocking insert clamp 14.

It is desirable for certain very difficult machining operations, such as boring transplant material on rotary engine blocks, to index the cutting insert 12 each time that an operation is performed so as toprovide a new cutting edge to each work piece. In the present invention, this is achieved by means of a swing arm 75 which is mounted in the tool block 10 so as to be pivotable about a shaft 77. The swing arm 75 carries a projecting extension 79 which is positioned and shaped so that it engages the rear of the crank return pin 30 on each cycle of operation to force this element forward to the left, as shown in FIG. 2. This causes the crank arm 18 to be rotated about the shaft 20, and the toggle pin 22 to be forced upwardly to the dotted line position shown in FIG. 3. Eventually the point is reached at which the crank return pin 30 engages the sides of the tool insert bar 16, thereby stopping further motion of the bell crank 18.

The swing arm 75 is shown in FIG. 1 as being mounted so that the extension 79 makes contact with the return pin 30. An alternate way of forming the swing arm of the present invention would be to mount it at an oblique angle so that the swing arm itself would be in contact with the rear end of the crank return pin 30, thereby eliminating the necessity of providing the extension arm 79. In either case, indexing occurs at a time when the release pin 60 is not applying substantial force to the clamp 14.

After a boring operation is completed, hydraulic pressure in the cylinder 66 is decreased and the piston 68 is allowed to return to its midpoint of travel by the piston return spring 72 and a wedge actuating spring 92, which has one end inserted in a bore 94 of the piston 68 and its other end secured to the shaft 98. During this motion, the swing arm 75 moves to a location where the extension 79 is not in engagement with the crank return pin 30. As the piston 68 returns to beyond the midpoint of travel, a travel limiting pin 96, which projects through apertures (not shown) in a coupling shaft 98 that is secured to the piston 68 and to the wedge shaft 74, restricts motion of the piston 68 relative to the wedge shaft 74. The piston return spring 72 then drives the piston 68 the remaining portion of its stroke to the right and carries the wedge shaft 74 along with it. It is this final portion of the stroke of the piston which unlocks the release pin 60 so that the index spring 32 can carry the toggle bell crank 18 and the toggle pin 22 through its indexing motion. Rocking action of the swing arm 75 results from the fact that the piston 68 is coupled through the coupler 81 to the extension arm 79 on the right of the travel limiting pin 96, as shown in FIG. 2.

The cutting insert of the present invention, as is seen in FIGS. 3 and 4, consists of a plurality of cutting sections each one of which may be utilized both for roughing and for finishing the surface of a work piece. As seen in the drawings, each of the cutting sections 112 have a trapezoidal shape with the base of the trapezoid being integral with the remaining portion of the cutting insert 12 and a roughing edge 102 and a finishing edge 104 which are joined by a substantially flat surface 105. The roughing edge 102 first contacts the work piece at an angle such that the sides 108,109 of the trapezoidal cutting section intersect the initial surface 114 of the work piece that is to be machined at acute angles, as shown by the angles 117,118.

Following the roughing cut, hydraulic pressure on the piston 68 is released and the indexing mechanism operates to index the cutting insert so that the finishing edge 104 is positioned, as shown in FIG. 4, whereby the surface 116 of the work piece being finished by the finishing edge 104 is positioned substantially parallel to the surface 105 of the insert 12. After the finishing cut of the work piece, the cutting insert 12 may be indexed to another location where a new roughing edge is to be presented to a new initial surface of the work piece in order to provide a new roughing cut. In this manner, a relative cheap cutting insert may be produced which provides satisfactory machining, but which, because of the relatively large number of cutting edges, may still allow for the machining of a large number of parts at a relatively small cost without excessive time being taken in the replacement of the cutting inserts.

When the cutting insert 12 has been indexed, hydraulic pressure is again applied to the piston 68 thereby forcing it to the midpoint of its travel where the wedge shaft 74 locks the insert 12 in place with several hundred poinds of pressure due to the action of the release pin 60 acting on the clamp 14. The piston 68 continues to travel the remainder of its stroke in the forward direction while overcoming the wedge actuating spring 92 as the wedge shaft 74 applies more pressure on the cutting insert 12 through the clamp 14. At the same time, the swing arm 75 is travelling forward so as to actuate the toggle bell crank 18 through the crank return pin 30. The toggle pin 22, which is hooked under the insert 12, then rotates against the insert groove 17 in the insert 12 until it swings clear of the insert by virtue of the index spring 32. Motion of the bell crank 18 and the toggle pin 22 is stopped when the crank return pin 30 stops against the insert tool block 16.

The cutting insert 12 may be removed by releasing the pressure applied to the finger 28 through the insert clamp 14. This is accomplished by releasing the hydraulic pressure automatically; or, alternately, the pressure may be released by means of a manual button 100 which, when depressed, will contact the forward end 83 of the wedge shaft 74 thereby forcing the wedge shaft 74 to the right causing the ball 84 and the clamp release pin 60 to drop down. The new insert 12 is put into place by pushing it into the recess 56 and snapping it past the toggle tooth 85 whereupon hydraulic pressure is reapplied or the wedge release button 100 is released.

When initially assemblying the boring bar, accumulative tolerances will not always result in the insert clamp 14 being correctly positioned relative to the position of the ballwedge shaft 74 or the locking balls 82,84 and the release pin 60. Therefore, while the piston 68 is pressurized, the wedge release button 100 may be depressed until the ball-wedge shaft 74 is forced to stop against the travel limiting pin 96. This represents the point at which the insert 12 should be clamped firmly by tightening the clamp holding screw 26. A locking set screw (not shown) may be used to tighten against the threads of the clamp holding screw 26, if desired.

The cutting tool insert 12 of the present invention is shown in the embodiment of FIG. 3. The insert is made to a specific rake angle; and it can be adjusted to a new tool position without disturbing the remainder of the mechanism, which is built inside of the boring bar. The cutting insert 12 may be formed of a ceramic or other hard butting insert and may have a relatively large number of teeth 15. It may be a throw-away part since with many cutting edges, the total cost per machined part is reduced. Also, since no tool adjustment is required between indexing and after insert changes, after initial set-up, time and labor costs are significantly reduced on hard-to-machine materials. In addition, hard-to-machine materials generally lose accuracy in machining due to wear of the cutting insert and to increased cutting force as the tool dulls. Narrow cutting points of one and one-half to two and one-half times the feed length are preferably employed on the cutting insert to reduce the total cutting force and the dulling of the insert by continual burnishing of an already finished surface.

By reference to FIGS. 3 and 4, it can be seen that the cutting insert 12 has a roughing edge 102 and a finishing edge 104 which are joined by a relatively flat surface 105. The roughing edge 102 removes about half of the material to be removed from the work piece 106. This preferably occurs at one and one-half to four times the feed sitance in front of the finishing edge. Machining is not done with the backside of the cutting edge on the flat surface 105 so that any wear that takes place on this part of the cutting edge becomes back clearance when the complete cutting edge presents itself as a finishing tool. A smooth surface finish relative to the feed rate is obtained by a large cutting radius cut off to a width of one and one-half and a two and one-half times the feed distance.

The clearance notches 17 may be formed so that they each have two straight sides 106,108 which make an angle greater than 45° therebetween, which angle preferably is an angle of approximately 90°. The angle measured from the center 110 of the cutting insert between the bottom of one clearance notch 17, and the next clearance notch may be approximately 22½°, as indicated in FIG. 3, for a cutting insert with 16 teeth. This angle, of course, would change with a change in the number of teeth employed; but a minimum of sixth teeth is preferred.

The invention is claimed as follows:

1. A device for holding and automatically indexing a removable cutting insert comprising a plurality of cutting sections which are selectively indexable so as to successively contact the surface of a work piece being machined comprising a tool block for receiving said insert, clamp means for exerting holding pressure on said insert to hold said insert in place in said block, force means for selectively applying and removing force on said clamp means, indexing means for indexing said cutting insert comprising engagement means for engaging said cutting insert in order to rotate said cutting insert through a predetermined angle, operating means for selectively operating said force means in order to apply or release said force on said clamp means and control means coupled to said operating means and to said indexing means and synchronized with said operating means which operates said indexing means so that said indexing means automatically acts to rotate said cutting insert only subsequent to the release of said force on said clamp means by said force means.

2. A device as claimed in claim 1 wherein said indexing means comprises a bell crank pivoted about a pivot point and constructed so that said engagement means is on one portion of said bell crank and a pin is secured to the portion of the bell crank that is on the opposite side of said pivot from said engagement means, said control means comprises a hydraulic cylinder, a piston movable in said cylinder in a first direction in said cylinder and in a second direction in said cylinder which is opposite to said first direction and a coupling means coupled to be driven with the motion of said piston having a member thereon which engages with said pin so as to operate said indexing means.

3. A device as claimed in claim 1 wherein said engagement meanscomprises a finger that is constructed so that it is deflectable from one cutting section to the next following an indexing operation and a bias means coupled to bias said finger into engagement with said cutting insert.

4. A device as claimed in claim 3 wherein said indexing means comprises a bell crank pivoted about a pivot point and constructed so that said engagement means is on one portion of said bell crank and a pin is secured to the portion of the bell crank that is on the opposite side of said pivot point from said engagement means, said control means comprises a hydraulic cylinder, a piston movable in said cylinder in a first direction in said cylinder and in a second direction in said cylinder which is opposite to said first direction and a coupling means coupled to be driven with the motion of said piston having a member thereon which engages with said pin so as to operate said indexing means.

* * * * *